United States Patent
Tang

(10) Patent No.: US 11,646,815 B2
(45) Date of Patent: *May 9, 2023

(54) TRANSMISSION PARAMETER DETERMINATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/859,851

(22) Filed: Apr. 27, 2020

(65) Prior Publication Data

US 2020/0260321 A1 Aug. 13, 2020

Related U.S. Application Data

(63) Continuation of application No. PCT/CN2017/109412, filed on Nov. 3, 2017.

(51) Int. Cl.
*H04W 72/04* (2009.01)
*H04L 1/00* (2006.01)
(Continued)

(52) U.S. Cl.
CPC .......... *H04L 1/0004* (2013.01); *H04L 1/0003* (2013.01); *H04W 4/40* (2018.02);
(Continued)

(58) Field of Classification Search
None
See application file for complete search history.

(56) References Cited

U.S. PATENT DOCUMENTS

2008/0108369 A1 5/2008 Visotsky
2016/0353410 A1 12/2016 Wang et al.
(Continued)

FOREIGN PATENT DOCUMENTS

CN 101911573 A 12/2010
CN 104349458 A 2/2015
(Continued)

OTHER PUBLICATIONS

Huawei et al: "Discussion on solving the code rate issue for supporting 64QAM" 3GPP Draft; R1-1717003, 3rd Generation Partnership Project (3GPP), Mobile Competence Centre: 650, Route Des Lucioles; F-06921 Sophia-Antipolis Cedex France vol. RAN WG1, No. Prague, Czech Republic; Oct. 9, 2017-Oct. 13, 2017 Sep. 29, 2017 (Sep. 29, 2017), XP051351509, Retrieved from the Internet: URL: http://www.3gpp.org/ftp/tsg_ran/WG1_RL1/TSGR1_90b/Docs/ [retrieved on Sep. 29, 2017] * section 2.1 *.
(Continued)

*Primary Examiner* — Willie J Daniel, Jr.
(74) *Attorney, Agent, or Firm* — Perkins Coie LLP

(57) ABSTRACT

Provided are a transmission parameter determination method, a terminal device and a network device. The method comprises: the terminal device determines a first transmission parameter according to the channel busy ratio (CBR) and the priority of service to be transmitted; and the terminal device sends the service to be transmitted using the first transmission parameter, and further comprises: the terminal device acquires at least one proportion coefficient, the at least one proportion coefficient being configured by a network device or pre-configured in the terminal device, wherein the operation of determining the first transmission parameter according to the CBR and the priority of the service to be transmitted comprises: the terminal device determines a second transmission parameter according to the
(Continued)

CBR and the priority of the service to be transmitted, and processes the second transmission parameter using the at least one proportion coefficient to obtain the first transmission parameter.

14 Claims, 5 Drawing Sheets

(51) Int. Cl.
| | |
|---|---|
| *H04W 4/70* | (2018.01) |
| *H04W 76/30* | (2018.01) |
| *H04W 72/1263* | (2023.01) |
| *H04W 4/40* | (2018.01) |
| *H04W 28/02* | (2009.01) |

(52) U.S. Cl.
CPC ......... *H04W 4/70* (2018.02); *H04W 28/0284* (2013.01); *H04W 28/0289* (2013.01); *H04W 72/1263* (2013.01); *H04W 76/30* (2018.02)

(56) References Cited

U.S. PATENT DOCUMENTS

| | | | |
|---|---|---|---|
| 2017/0303159 | A1 | 10/2017 | Ma et al. |
| 2018/0049073 | A1 | 2/2018 | Dinan et al. |
| 2018/0131428 | A1 | 5/2018 | Chen et al. |
| 2019/0104525 | A1 | 4/2019 | Santhanam et al. |
| 2019/0110178 | A1 | 4/2019 | Baghel et al. |
| 2020/0195371 | A1* | 6/2020 | Tang ................ H04W 28/0284 |

FOREIGN PATENT DOCUMENTS

| | | | |
|---|---|---|---|
| CN | 106027197 | A | 10/2016 |
| EP | 3618542 | A1 | 3/2020 |
| JP | 2017537498 | A | 12/2017 |
| JP | 2020519054 | A | 6/2020 |
| RU | 2421927 | C2 | 6/2011 |
| WO | 2017176096 | A1 | 10/2017 |

OTHER PUBLICATIONS

LTE; Evolved Universal Terrestrial Radio Access (E-UTRA); Medium Access Control (MAC) protocol specification (3GPP TS 36.321 version 14.4.0 Release 14) ETSI Technical Specification, European Telecommunications Standards Institute (ETSI), 650, Route Des Lucioles ; F-06921 Sophia-Antipolis; France vol. 3GPP RAN, No. V14.4. 0 Oct. 9, 2017 (Oct. 9, 2017), pp. 1-110, XP014301820 [retrieved on Oct. 9, 2017] * section 5.14.1.2.2 Sidelink process *.
LG Electronics. "Discussion on 64QAM support in PC5 operation", 3GPP TSG RAN WG1 Meeting #90-bis R1-1717266 Prague, Czechia, Oct. 9-13, 2017, published on Oct. 6, 2017.
Intel Corporation. "Support of 64QAM for LTE V2V sidelink communication", 3GPP TSG RAN WG1 Meeting #90bis R1-1717332 Prague, Czech Republic, Oct. 9-13, 2017, published on Oct. 6, 2017.
Ericsson. "Supporting 64QAM on PC5", 3GPP TSG-RAN WG1 Meeting #90bis R1-1717733 Prague, Czech Republic, Oct. 9-13, 2017, published on Oct. 6, 2017.
Supplementary European Search Report in the European application No. 17930744.2, dated Aug. 6, 2020.
Written Opinion of the International Search Authority in the international application No. PCT/CN2017/109412, dated Jul. 6, 2018.
3GPP TSG-RAN WG2 Meeting #98 R2-1705857, Hangzhou, China, May 15-19, 2017, Title: Miscellaneous corrections to V2X in TS 36.321, Source to WG: Huawei, Hisilicon, Source to TSG: R2, Work item code: LTE_V2X-Core. 11 pages.
3GPP TSG-RAN WG2 #98 R2-1705633, Hangzhou, China, May 15-19, 2017, Agenda Item: 8.13.2, Source: LG Electronics Inc., Title: Correction to CBR based TX parameters, Document for : Discussion and Decision. 3 pages.
3GPP TSG RAN WG1 Meeting #87 R1-1613274, Reno, US Nov. 14-18, 2016, Agenda item: 6.2.1.4.1, Title: WF on congestion control, Huawei, HiSilicon, NEC, OPPO. 4 pages.
First Office Action of the Japanese application No. 2020-514226, dated Aug. 20, 2021. 4 pages with English translation.
Second Office Action of the Canadian application No. 3066669, dated Sep. 22, 2021. 5 pages.
Notice of Allowance of the Russian application No. 2020100353, dated Dec. 15, 2020.
First Office Action of the Canadian application No. 3066669, dated Feb. 8, 2021.
Final Office Action of the U.S. Appl. No. 16/798,640, dated Feb. 9, 2021.
First Office Action of the Chilean application No. 201903834, dated Mar. 16, 2021.
3GPP TSG RAN WG1 Meeting #87 R1-1611133, Reno, USA, Nov. 14-18, 2016; Agenda Item: 6.2.1.4.1; Source: Huawei, HiSilicon; Title: Remaining details of congestion control for V2V.
First Office Action of the Chinese application No. 202010070657.0, dated Apr. 27, 2021.
First Office Action of the European application No. 17930744.2, dated May 19, 2021.
Office Action of the Indian application No. 201917054019, dated Mar. 22, 2021.
First Office Action of the U.S. Appl. No. 16/798,640, dated Oct. 7, 2020.
International Search Report in the international application No. PCT/CN2017/109412, dated Jul. 6, 2018.
CATT. Discussion on 64QAM Modulation Scheme in V2X Phase 2. R1-1717791, 3GPP TSG RAN WG1 Meeting #90bis. Sep. 30, 2017 (Sep. 30, 2017), section 2.
Huawei, Hisilicon. Discussion on TBS and MCS Selection for PSSCH Transmission. R1-1713369, 3GPP TSG RAN WG1 Meeting #90. Aug. 12, 2017 (Aug. 12, 2017), entire document.
First Office Action of the Korean application No. 10-2020-7006891, dated Feb. 24, 2022. 9 pages with English translation.
First Office Action of the Israeli application No. 271337, dated Jun. 29, 2022 (4 pages).
ZTE, Sanechips "Support for 64QAM" 3GPP TSG RAN WG1 Meeting #90bis R1-1717101, Prague, CZ; Oct. 9-13, 2017. 5 pages.
Ericsson, "Techniques for reliability", 3GPP TSG-RAN WG1 Meeting #90bis R1-1717453, Prague, CZ; Oct. 9-13, 2017. 5 pages.
Samsung "High order modulation in V2X" 3GPP TSG RAN WG1 Meeting 90bis R1-1717556, Prague, CZ; Oct. 9-13, 2017. 3 pages.
OPPO "64QAM support for eV2X" 3GPP TSG RAN WG1 Meeting #90bis R1-1718038, Prague, CZ; Oct. 9-13, 2017. 3 pages.
First Office Action of the Japanese application No. 2021-206049, dated Nov. 25, 2022. 19 pages with English translation.
European Search Report in the European application No. 22201504. 2, dated Jan. 23, 2023. 11 pages.
Notice of rejection of the Japanese application No. 2021-206049, dated Mar. 3, 2023.
No Author. 3GPP TS 36.321 V14.4.0 3rd Generation Partnership Project; Technical Specification Group Radio Access Network; Evolved Universal Terrestrial Radio Access (E-UTRA); Medium Access Control (MAC) protocol specification (Release 14), Sep. 25, 2017, pp. 53-63.

* cited by examiner

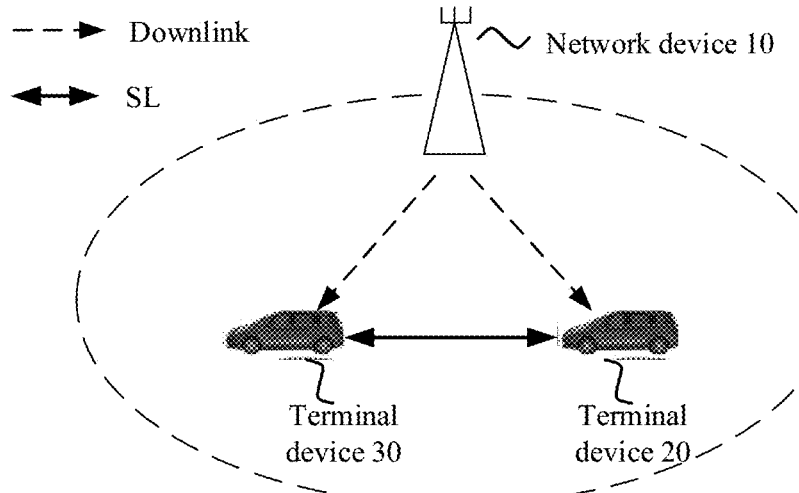
FIG. 1
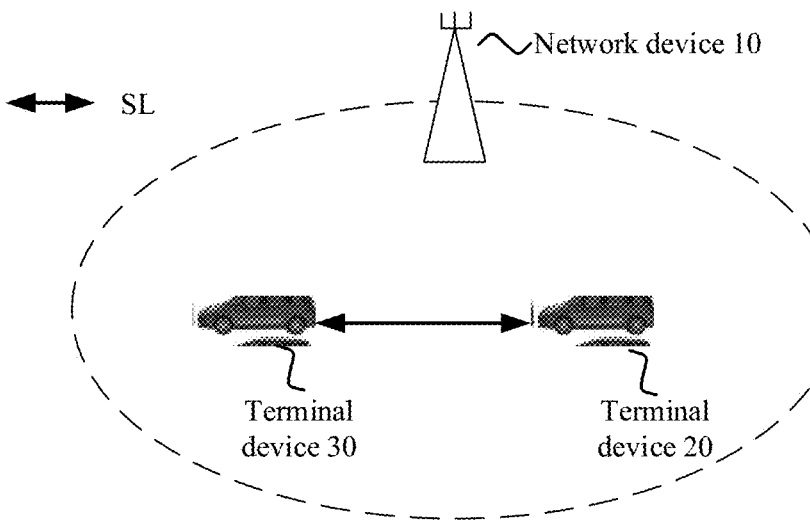
FIG. 2
200
| A terminal device determines a first transmission parameter according to a CBR and a priority of a service to be transmitted | ~210 |
| The terminal device sends the service to be transmitted using the first transmission parameter | ~220 |
FIG. 3

TRANSMISSION PARAMETER DETERMINATION METHOD, TERMINAL DEVICE AND NETWORK DEVICE

CROSS-REFERENCE TO RELATED APPLICATION

This is a continuation application of International Application No. PCT/CN2017/109412 filed on Nov. 3, 2017, the contents of which are hereby incorporated by reference in its entirety.

TECHNICAL FIELD

The disclosure relates to the field of communication, and more particularly to a transmission parameter determination method, a terminal device and a network device.

BACKGROUND

In a Release 14 (Rel-14) Internet of vehicles system, a network device (for example, a base station) configures a transmission parameter, for example, a Modulation and Coding Scheme (MCS) range, according to an existing MCS table of Long Term Evolution (LTE).

In a Rel-15 Internet of vehicles system, a new MCS table is introduced and, meanwhile, there is made a new requirement on a transmission parameter, for example, a requirement to support modulation of 64 Quadrature Amplitude Modulation (QAM). Therefore, in Rel-15, an urgent problem to be solved is to configure a transmission parameter based on the new MCS table or determine a transmission parameter for a Rel-15 terminal device based on an existing transmission parameter.

BRIEF DESCRIPTION OF DRAWINGS

FIG. 1 is a schematic diagram of an application scenario according to an embodiment of the disclosure.

FIG. 2 is a schematic diagram of another application scenario according to an embodiment of the disclosure.

FIG. 3 is a schematic flowchart of a transmission parameter determination method according to an embodiment of the disclosure.

DETAILED DESCRIPTION

Figures 4, 5:
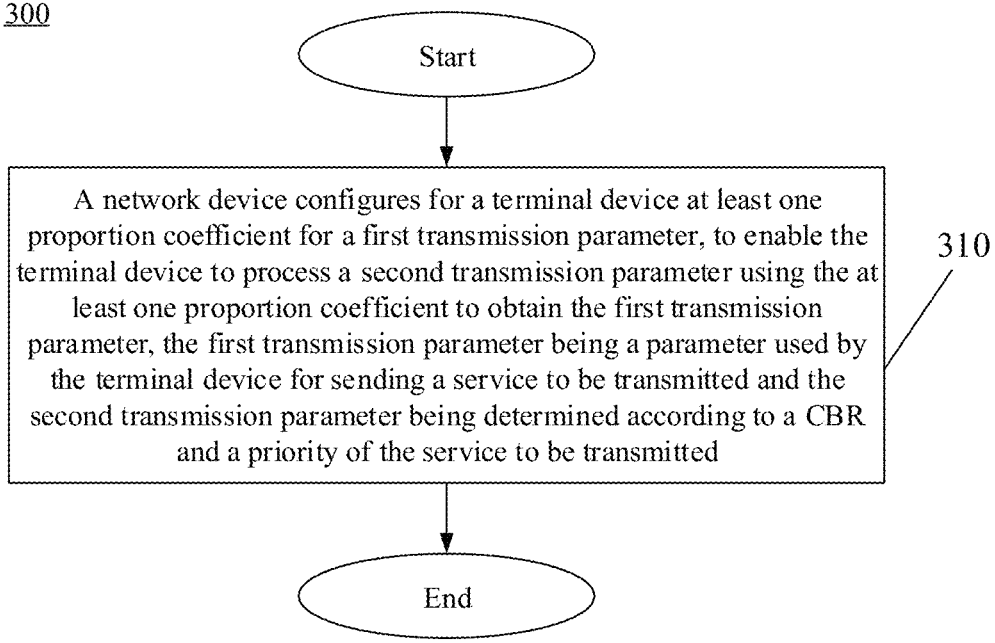
FIG. 4 is a schematic flowchart of another transmission parameter determination method according to an embodiment of the disclosure.
FIG. 5 is a schematic flowchart of another transmission parameter determination method according to an embodiment of the disclosure.

The technical solutions in the embodiments of the disclosure will be clearly and completely described below in combination with the drawings in the embodiments of the disclosure.

It is to be understood that the technical solutions of the embodiments of the disclosure may be applied to a Device to Device (D2D) communication system, for example, an Internet of vehicles system performing D2D communication based on LTE. Unlike a manner of receiving or sending communication data between terminals in a conventional LTE system through a network device (for example, a base station), the Internet of vehicles system adopts a D2D communication manner, and thus has a higher spectral efficiency and a shorter transmission delay.

In at least one embodiment, a communication system that the Internet of vehicles system is based on may be a Global System of Mobile communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system, a 5th-Generation (5G) New Radio (NR) system and the like.

A terminal device in the embodiments of the disclosure may be a terminal device capable of implementing D2D communication. For example, the terminal device may be a vehicle-mounted terminal device, and may also be a terminal device in a 5G network, a terminal device in a future evolved Public Land Mobile Network (PLMN) or the like. There are no limits made in the embodiments of the disclosure.

Embodiments of the disclosure provide a method for transmission parameter determination, a terminal device and a network device. A Rel-15 terminal device determines a transmission parameter based on a new MCS table or determines the transmission parameter based on an existing transmission parameter, thereby meeting a transmission requirement of the Rel-15 terminal device.

According to a first aspect, the embodiments of the disclosure provide a method for transmission parameter determination, which may include the following operations.

A terminal device determines a first transmission parameter according to a Channel Busy Ratio (CBR) and a priority of a service to be transmitted.

The terminal device sends the service to be transmitted using the first transmission parameter.

In at least one example, the terminal device may be a terminal device supporting Rel 15 communication.

In such a manner, in the method for transmission parameter determination of the embodiments of the disclosure, the terminal device determines the first transmission parameter for sending the service to be transmitted according to the CBR and the priority of the service to be transmitted, so that the terminal device may determine a transmission parameter meeting a Rel 15 transmission requirement.

In at least one implementation mode of the first aspect, the method may further include the following operation.

The terminal device acquires at least one proportion coefficient. The at least one proportion coefficient is configured by a network device or pre-configured in the terminal device.

The operation that the terminal device determines the first transmission parameter according to the CBR and the priority of the service to be transmitted may include the following actions.

The terminal device determines a second transmission parameter according to the CBR and the priority of the service to be transmitted.

The terminal device processes the second transmission parameter using the at least one proportion coefficient to obtain the first transmission parameter.

In such a manner, in the method for transmission parameter determination of the embodiments of the disclosure, the terminal device may process the second transmission parameter determined according to the CBR and the priority of the service to be transmitted using the at least one proportion coefficient to obtain the first transmission parameter for sending the service to be transmitted. Therefore, the terminal device may determine a transmission parameter for Rel-15 based on an existing transmission parameter, and a transmission requirement of the Rel-15 terminal device is met.

In at least one example, the network device may configure the at least one proportion coefficient through Radio Resource Control (RRC) signaling.

In at least one implementation mode of the first aspect, the operation that the terminal device determines the second transmission parameter according to the CBR and the priority of the service to be transmitted may include the following actions.

The terminal device acquires a first mapping relationship. The first mapping relationship indicates a mapping relationship among CBRs, priorities of services and second transmission parameters.

The terminal device determines the second transmission parameter according to the CBR, the priority of the service to be transmitted and the first mapping relationship.

The first mapping relationship may be pre-configured in the terminal device or configured by the network device.

In at least one example, the mapping relationship among the CBRs, the priorities of services and the second transmission parameters may be a mapping table of the CBRs, the priorities of services and the second transmission parameters.

In at least one example, the network device may configure the mapping relationship among the CBRs, the priorities of services and the second transmission parameters through the RRC signaling.

Further, the terminal device may determine the second transmission parameter according to the CBR, the priority of the service to be transmitted and the mapping relationship among the CBRs, the priorities of services and the second transmission parameters, thereby determining the first transmission parameter.

In at least one implementation mode of the first aspect, the first transmission parameter is at least one of an MCS range, a Physical Resource Block (PRB) number range or a sub-band number range, and the second transmission parameter is at least one of an MCS range, a PRB number range or a sub-band number range.

In at least one implementation mode of the first aspect, the first transmission parameter and the second transmission parameter may be MCS ranges, and the terminal device may acquire a proportion coefficient K, K being a real number greater than 0.

The operation that the terminal device processes the second transmission parameter using the at least one proportion coefficient to obtain the first transmission parameter may include the following actions.

The terminal device processes a minimum MCS index of the second transmission parameter using the proportion coefficient K to obtain a minimum MCS index of the first transmission parameter, and processes a maximum MCS index of the second transmission parameter using the proportion coefficient K to obtain a maximum MCS index of the first transmission parameter.

The terminal device determines the first transmission parameter according to the minimum MCS index and the maximum MCS index of the first transmission parameter.

In at least one implementation mode of the first aspect, the first transmission parameter and the second transmission parameter may be the MCS ranges, and the terminal device may acquire proportion coefficients M and N. M is a real number greater than 0 and N is a real number greater than 0.

The operation that the terminal device processes the second transmission parameter using the at least one proportion coefficient to obtain the first transmission parameter may include the following actions.

The terminal device processes a minimum MCS index of the second transmission parameter using the proportion coefficient M to obtain a minimum MCS index of the first transmission parameter, and processes a maximum MCS index of the second transmission parameter using the proportion coefficient N to obtain a maximum MCS index of the first transmission parameter.

The network device determines the first transmission parameter according to the minimum MCS index and the maximum MCS index of the first transmission parameter.

It is to be understood that the proportion coefficients M and N are different values.

In at least one implementation mode of the first aspect, the first transmission parameter and the second transmission parameter may be PRB number ranges, and the terminal device may acquire a proportion coefficient Q, Q being a real number greater than 0.

The operation that the terminal device processes the second transmission parameter using the at least one proportion coefficient to obtain the first transmission parameter may include the following actions.

The terminal device processes a minimum PRB number of the second transmission parameter using the proportion coefficient Q to obtain a minimum PRB number of the first transmission parameter, and processes a maximum PRB number of the second transmission parameter using the proportion coefficient Q to obtain a maximum PRB number of the first transmission parameter.

The terminal device determines the first transmission parameter according to the minimum PRB number and the maximum PRB number of the first transmission parameter.

In at least one implementation mode of the first aspect, the first transmission parameter and the second transmission parameter may be the PRB number ranges, and the terminal device may acquire proportion coefficients X and Y, X being a real number greater than 0 and Y being a real number greater than 0.

The operation that the terminal device processes the second transmission parameter using the at least one proportion coefficient to obtain the first transmission parameter may include the following actions.

The terminal device processes a minimum PRB number of the second transmission parameter using the proportion coefficient X to obtain a minimum PRB number of the first transmission parameter, and processes a maximum PRB number of the second transmission parameter using the proportion coefficient Y to obtain a maximum PRB number of the first transmission parameter.

The terminal device determines the first transmission parameter according to the minimum PRB number and the maximum PRB number of the first transmission parameter.

It is to be understood that the proportion coefficients X and Y are different values.

In at least one implementation mode of the first aspect, the first transmission parameter and the second transmission parameter are sub-band number ranges, and the terminal device acquires a proportion coefficient R, R being a real number greater than 0.

The operation that the terminal device processes the second transmission parameter using the at least one proportion coefficient to obtain the first transmission parameter includes the following actions.

The terminal device processes a minimum sub-band number of the second transmission parameter using the proportion coefficient R to obtain a minimum sub-band number of the first transmission parameter, and processes a maximum sub-band number of the second transmission parameter using the proportion coefficient R to obtain a maximum sub-band number of the first transmission parameter.

The terminal device determines the first transmission parameter according to the minimum sub-band number and the maximum sub-band number of the first transmission parameter.

In at least one implementation mode of the first aspect, the first transmission parameter and the second transmission parameter are the sub-band number ranges, and the terminal device acquires proportion coefficients V and W, V being a real number greater than 0 and W being a real number greater than 0.

The operation that the terminal device processes the second transmission parameter using the at least one proportion coefficient to obtain the first transmission parameter includes the following actions.

The terminal device processes a minimum sub-band number of the second transmission parameter using the proportion coefficient V to obtain a minimum sub-band number of the first transmission parameter, and processes a maximum sub-band number of the second transmission parameter using the proportion coefficient W to obtain a maximum sub-band number of the first transmission parameter.

The terminal device determines the first transmission parameter according to the minimum sub-band number and the maximum sub-band number of the first transmission parameter.

It is to be understood that the proportion coefficients V and W are different values.

In at least one implementation mode of the first aspect, the method may be applied to a Device to Device (D2D) system.

According to a second aspect, the embodiments of the disclosure provide a method for transmission parameter determination, which may include the following operation.

A network device configures for a terminal device at least one proportion coefficient for a first transmission parameter, to enable the terminal device to process a second transmission parameter using the at least one proportion coefficient to obtain the first transmission parameter.

The first transmission parameter may be a parameter used by the terminal device for sending a service to be transmitted, and the second transmission parameter may be determined according to a CBR and a priority of the service to be transmitted.

In at least one example, the terminal device may be a terminal device supporting Rel-15 communication.

In such a manner, in the method for transmission parameter determination of the embodiments of the disclosure, the terminal device may process the second transmission parameter determined according to the CBR and the priority of the service to be transmitted by use of the at least one proportion coefficient to obtain the first transmission parameter for sending the service to be transmitted, such that the terminal device may determine a transmission parameter for Rel-15 based on an existing transmission parameter, and a transmission requirement of the Rel-15 terminal device is met.

In at least one implementation mode of the second aspect, the method may further include the following operation.

The network device configures a mapping relationship among CBRs, priorities of services and second transmission parameters for the terminal device, to enable the terminal device to determine the second transmission parameter according to the CBR, the priority of the service to be transmitted and the mapping relationship.

In at least one implementation mode of the second aspect, the operation that the network device configures the mapping relationship among the CBRs, the priorities of services and the second transmission parameters for the terminal device may include the following action.

The network device configures the mapping relationship for the terminal device through RRC signaling.

In at least one example, the mapping relationship among the CBRs, the priorities of services and the second transmission parameters may be a mapping table of the CBRs, the priorities of services and the second transmission parameters.

In at least one implementation mode of the second aspect, the first transmission parameter may be at least one of an MCS range or a PRB number range, and the second transmission parameter may be at least one of an MCS range or a PRB number range.

In at least one implementation mode of the second aspect, the operation that the network device configures for the terminal device the at least one proportion coefficient for the first transmission parameter may include the following action.

The network device configures the at least one proportion coefficient for the terminal device through the RRC signaling.

In at least one implementation mode of the second aspect, the method may be applied to a D2D system.

According to a third aspect, the embodiments of the disclosure provide a method for transmission parameter determination, which may include the following operations.

A network device configures a first mapping relationship for a first terminal device. The first mapping relationship is configured to indicate a correspondence among CBRs, priorities of services and first transmission parameters.

The network device configures a second mapping relationship for a second terminal device. The second mapping relationship is configured to indicate a correspondence among CBRs, priorities of services and second transmission parameters.

The first transmission parameter may include a first MCS index, and the second transmission parameter may include a second MCS index.

In such a manner, in the method for transmission parameter determination of the embodiments of the disclosure, the network device configures the first mapping relationship for the first terminal device, so that the first terminal device may determine the first transmission parameter including the first MCS index according to the first mapping relationship. Meanwhile, the network device configures the second mapping relationship for the second terminal device, so that the second terminal device may determine the second transmission parameter including the second MCS index according to the second mapping relationship.

In at least one implementation mode of the third aspect, the first MCS index may be obtained according to a first MCS table, and the second MCS index may be obtained according to a second MCS table. The first MCS table may be different from the second MCS table.

Furthermore, the first MCS table corresponding to the first MCS index is different from the second MCS table corresponding to the second MCS index, so that the terminal device may determine the MCS index thereof according to the MCS table under a supported communication protocol.

In at least one implementation mode of the third aspect, the first terminal device may support a Rel-15 communication protocol, and the second terminal device may support a Rel-14 communication protocol.

In at least one implementation mode of the third aspect, the method may be applied to a D2D system.

According to a fourth aspect, the embodiments of the disclosure provide a method for transmission parameter determination, which may include the following operation.

A first terminal device determines a transmission parameter of the first terminal device according to a CBR, a priority of a service to be transmitted and a first mapping relationship. The first mapping relationship is configured to indicate a correspondence among CBRs, priorities of services and transmission parameters of the first terminal device.

The transmission parameter of the first terminal device includes an MCS index, and an MCS table corresponding to the MCS index of the first terminal device is different from an MCS table corresponding to an MCS index of a second terminal device. The second terminal device is a terminal device supporting a version of a communication protocol different from a version of a communication protocol supported by the first terminal device.

In such a manner, in the method for transmission parameter determination of the embodiments of the disclosure, the first terminal device determines the transmission parameter of the first terminal device according to the CBR, the priority of the service to be transmitted and the first mapping relationship, and meanwhile, the MCS table corresponding to the MCS index of the first terminal device is different from the MCS table corresponding to the MCS index of the second terminal device. Therefore, the first terminal device may determine the MCS index thereof according to the MCS table in the supported communication protocol.

In at least one implementation mode of the fourth aspect, the method may further include the following operation.

The first terminal device receives the first mapping relationship from a network device.

In at least one implementation mode of the fourth aspect, the first mapping relationship may be pre-configured in the first terminal device.

In at least one implementation mode of the fourth aspect, the first terminal device may support a Rel-15 communication protocol, and the second terminal device may support a Rel-14 communication protocol.

In at least one implementation mode of the fourth aspect, the method may be applied to a D2D system.

According to a fifth aspect, the embodiments of the disclosure provide a terminal device. The terminal device may include modules or units executing the method in the first aspect or any implementation mode of the first aspect.

According to a sixth aspect, the embodiments of the disclosure provide a network device. The network device may include modules or units executing the method in the second aspect or any implementation mode of the second aspect.

According to a seventh aspect, the embodiments of the disclosure provide a network device. The network device may include modules or units executing the method in the third aspect or any implementation mode of the third aspect.

According to an eighth aspect, the embodiments of the disclosure provide a terminal device. The terminal device may include modules or units executing the method in the fourth aspect or any implementation mode of the fourth aspect.

A ninth aspect provides a terminal device, which includes a processor, a memory and a communication interface. The processor is connected with the memory and the communication interface. The memory is configured to store an instruction, the processor is configured to execute the instruction, and the communication interface is configured for communication with another network element under control of the processor. When the processor executes the instruction stored in the memory, such execution enables the processor to execute the method in the first aspect or any possible implementation mode of the first aspect.

A tenth aspect provides a network device, which includes a processor, a memory and a communication interface. The processor is connected with the memory and the communication interface. The memory is configured to store an instruction, the processor is configured to execute the instruction, and the communication interface is configured for communication with another network element under control of the processor. When the processor executes the instruction stored in the memory, such execution enables the processor to execute the method in the second aspect or any possible implementation mode of the second aspect.

An eleventh aspect provides a network device, which includes a processor, a memory and a communication interface. The processor is connected with the memory and the communication interface. The memory is configured to store an instruction, the processor is configured to execute the instruction, and the communication interface is configured for communication with another network element under control of the processor. When the processor executes the instruction stored in the memory, such execution enables the processor to execute the method in the third aspect or any possible implementation mode of the third aspect.

A twelfth aspect provides a terminal device, which includes a processor, a memory and a communication interface. The processor is connected with the memory and the communication interface. The memory is configured to store an instruction, the processor is configured to execute the instruction, and the communication interface is configured for communication with another network element under control of the processor. When the processor executes the instruction stored in the memory, such execution enables the processor to execute the method in the fourth aspect or any possible implementation mode of the fourth aspect.

A thirteenth aspect provides a computer storage medium, in which a program code is stored. The program code includes an instruction configured to instruct a computer to execute the method in the first aspect or any possible implementation mode of the first aspect.

A fourteenth aspect provides a computer storage medium, in which a program code is stored. The program code includes an instruction configured to instruct a computer to execute the method in the second aspect or any possible implementation mode of the second aspect.

A fifteenth aspect provides a computer storage medium, in which a program code is stored. The program code includes an instruction configured to instruct a computer to execute the method in the third aspect or any possible implementation mode of the third aspect.

A sixteenth aspect provides a computer storage medium, in which a program code is stored. The program code includes an instruction configured to instruct a computer to execute the method in the fourth aspect or any possible implementation mode of the fourth aspect.

A seventeenth aspect provides a computer program product including an instruction. The computer program product runs on a computer to enable the computer to execute the method in each aspect.

FIG. 1 and FIG. 2 are schematic diagrams of an application scenario according to an embodiment of the disclosure. FIG. 1 exemplarily illustrates a network device and two terminal devices. In at least one embodiment of the disclosure, a wireless communication system may include multiple network devices and another number of terminal devices may be included in coverage of each network device. There are no limits made thereto in the embodiments of the disclosure.

In at least one embodiment, the wireless communication system may further include another network entity such as a Mobile Management Entity (MME), a Serving Gateway (S-GW) and a Packet Data Network Gateway (P-GW). Alternatively, the wireless communication system may further include another network entity such as a Session Management Function (SMF), Unified Data Management (UDM) and an Authentication Server Function (AUSF). There are no limits made thereto in the embodiment of the disclosure.

Specifically, the terminal device 20 may communicate with the terminal device 30 in a D2D communication mode. During the D2D communication, the terminal device 20 directly communicates with the terminal device 30 through a D2D link, i.e., a Sidelink (SL). As illustrated in FIG. 1 or FIG. 2, the terminal device 20 directly communicates with the terminal device 30 through the SL. In FIG. 1, the terminal device 20 communicates with the terminal device 30 through the SL, and a transmission resource is allocated by the network device. In FIG. 2, the terminal device 20 communicates with the terminal device 30 through the SL, and a transmission resource is selected autonomously by the terminal device, without requiring the network device to allocate the transmission resource.

The D2D communication may indicate Vehicle to Vehicle (V2V) communication or Vehicle to Everything (V2X) communication. In V2X communication, X may generally indicate any device with a wireless receiving and sending capability, for example, but not limited to, a wireless device moving at a low speed, a vehicle-mounted device moving at a high speed or a network control node with a wireless transmitting and receiving capability, etc. It is to be understood that the embodiments of the disclosure are mainly applied to a V2X communication scenario, but may also be applied to any other D2D communication scenario. There are no limits made thereto in the embodiments of the disclosure.

There are two types of terminal devices in an Internet of vehicles system, i.e., terminal devices with a monitoring capability, such as Vehicle User Equipment (VUE) or Pedestrian User Equipment (PUE), and terminal devices without any monitoring capability, such as PUE. VUE has a higher processing capability, and is usually powered by a storage battery in a vehicle. PUE has a relatively low processing capability, and a main factor required to be considered for PUE is reduction in power consumption. Therefore, in an existing Internet of vehicles system, VUE is considered to have a complete receiving capability and monitoring capability, while PUE is considered to have partial or no receiving and monitoring capabilities. If the PUE has the partial monitoring capability, a monitoring method similar to that for the VUE may be adopted for resource selection of the PUE, and an available resource is selected from resources with the monitoring capability. If the PUE has no monitoring capability, the PUE randomly selects a transmission resource from a resource pool.

In a Release-14 (Rel-14) Internet of vehicles systems supporting the 3rd Generation Partnership Project (3GPP) protocol, a terminal device may measure a congestion level of a system, for example, a channel busy ratio (CBR). A network device (for example, a base station) may configure some terminal devices to report measurement results to the base station, and the base station may configure transmission parameters according to the CBR reported by the terminal device and a priority of a service, for example, an MCS range allowed by the terminal device, an available PRB number range, the number of retransmission times and a maximum transmit power.

In a Rel-14 Internet of vehicles system, a maximum-supported MCS modulation order is 16QAM, and a modulation manner of 64QAM is not supported. In a Rel-15 Internet of vehicles system, 64QAM transmission is required to be supported for supporting a higher transmission rate. However, since a frame structure of an Internet of vehicles system, compared with an LTE system, has more pilot symbols, a code rate greater than 1 may occur in an MCS level corresponding to 64QAM. Therefore, it is necessary to modify the existing MCS table of LTE and proportionally adjust a Transmission Block Size (TBS) table.

In the Rel-15 Internet of vehicles system, a new MCS table is introduced. Therefore, a transmission parameter for a Rel-15 terminal device may be configured according to the new MCS table.

In addition, each aspect or feature of the disclosure may be implemented into a method, a device or a product programmed with a standard and/or using an engineering technology. Term "product" used in the disclosure covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disk (CD) and a Digital Versatile Disk (DVD)), a smart card and a flash memory (for example, an Erasable Programmable Read-Only Memory (EPROM), a card, a stick or a key driver). In addition, various storage media described in the disclosure may represent one or more devices and/or other machine-readable media configured to store information. Term "machine-readable medium" may include, but not limited to, various media capable of storing, including and/or bearing instructions and/or data.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

FIG. 3 is a schematic flowchart of a method 200 for transmission parameter determination according to an embodiment of the disclosure. As illustrated in FIG. 3, the method 200 may be executed by a terminal device, the terminal device may be the terminal device illustrated in FIG. 1 or FIG. 2, and a network device in the method 200 may be the network device illustrated in FIG. 1. The method 200 includes the following content.

In 210, the terminal device determines a first transmission parameter according to a CBR and a priority of a service to be transmitted.

In at least one embodiment, the first transmission parameter is at least one of an MCS range, a PRB number range or a sub-band number range.

In at least one embodiment, the terminal device is a terminal device capable of performing Rel-15 communication.

In at least one embodiment, the method 200 further includes the following operation.

The terminal device acquires at least one proportion coefficient.

For example, the terminal device receives the at least one proportion coefficient configured by the network device.

In at least one embodiment, the network device may configure the at least one proportion coefficient for the terminal device through RRC signaling.

For another example, the at least one proportion coefficient is pre-configured for the terminal device.

Specifically, the terminal device may determine the first transmission parameter in the following manner.

The terminal device determines a second transmission parameter according to the CBR and the priority of the service to be transmitted.

The terminal device processes the second transmission parameter by use of the at least one proportion coefficient to obtain the first transmission parameter.

In at least one embodiment, the second transmission parameter is at least one of an MCS range, a PRB number range or a sub-band number range.

It is to be understood that, if the first transmission parameter is an MCS range, the second transmission parameter is also an MCS range, if the first transmission parameter is a PRB number range, the second transmission parameter is also a PRB number range and, if the first transmission parameter is a sub-band number range, the second transmission parameter is also a sub-band number range.

In at least one embodiment, the method 200 further includes the following operation.

The terminal device acquires a first mapping relationship. The first mapping relationship indicates a mapping relationship among CBRs, priorities of services and second transmission parameters.

For example, the terminal device receives the first mapping relationship configured by the network device.

In at least one embodiment, the network device may configure the first mapping relationship for the terminal device through the RRC signaling.

For another example, the first mapping relationship may be pre-configured for the terminal device.

In at least one embodiment, the first mapping relationship may be a table that reflects the mapping relationship among CBRs, priorities of services and second transmission parameters.

Specifically, the terminal device may determine the second transmission parameter in the following manner.

The terminal device determines the second transmission parameter according to the CBR, the priority of the service to be transmitted and the first mapping relationship.

In at least one embodiment, a minimum MCS index of the first transmission parameter may be represented by a Minimum Modulation and Coding Scheme-Physical Sidelink Shared Channel-Release 15 (minMCS-PSSCH-r15), and a maximum MCS index of the first transmission parameter may be represented by a Maximum Modulation and Coding Scheme-Physical Sidelink Shared Channel-Release 15 (maxMCS-PSSCH-r15). A minimum MCS index of the second transmission parameter may be represented by a Minimum Modulation and Coding Scheme-Physical Sidelink Shared Channel-Release 14 (minMCS-PSSCH-r14), and a maximum MCS index of the second transmission parameter may be represented by a Maximum Modulation and Coding Scheme-Physical Sidelink Shared Channel-Release 14 (maxMCS-PSSCH-r14).

In at least one embodiment, in condition that the first transmission parameter and the second transmission parameter are MCS ranges and the terminal device acquires a proportion coefficient K, where K is a real number greater than 0, the terminal device processes the minimum MCS index of the second transmission parameter by use of the proportion coefficient K to obtain the minimum MCS index of the first transmission parameter, and processes the maximum MCS index of the second transmission parameter by use of the proportion coefficient K to obtain the maximum MCS index of the first transmission parameter.

The terminal device determines the first transmission parameter according to the minimum MCS index and maximum MCS index of the first transmission parameter.

For example, minMCS-PSSCH-r15=ceil(K*minMCS-PSSCH-r14); and maxMCS-PSSCH-r15=ceil(K*maxMCS-PSSCH-r14), where ceil( ) represents rounding up.

The terminal device determines the MCS range according to minMCS-PSSCH-r15 and maxMCS-PSSCH-r15.

In at least one embodiment, in condition that the first transmission parameter and the second transmission parameter are the MCS ranges and the terminal device acquires proportion coefficients M and N, where M is a real number greater than 0 and N is a real number greater than 0, the terminal device processes the minimum MCS index of the second transmission parameter by use of the proportion coefficient M to obtain the minimum MCS index of the first transmission parameter, and processes the maximum MCS index of the second transmission parameter by use of the proportion coefficient N to obtain the maximum MCS index of the first transmission parameter.

The terminal device determines the first transmission parameter according to the minimum MCS index and the maximum MCS index of the first transmission parameter.

For example, minMCS-PSSCH-r15=ceil(M*minMCS-PSSCH-r14); and maxMCS-PSSCH-r15=ceil(N*maxMCS-PSSCH-r14), where ceil( ) represents rounding up.

The terminal device determines the MCS range according to minMCS-PSSCH-r15 and maxMCS-PSSCH-r15.

It is to be understood that the proportion coefficients M and N are different values.

In at least one embodiment, determination of the minMCS-PSSCH-r15 and the maxMCS-PSSCH-r15 by rounding up ceil( ) is only one implementation mode of the embodiment of the disclosure. In the embodiment of the disclosure, rounding down floor( ) and rounding round( ) may also be adopted, or determination of the minMCS- PSSCH-r15 and determination of the maxMCS-PSSCH-r15 may be implemented by different operations.

In at least one embodiment, a minimum PRB number of the first transmission parameter may be represented by a Minimum Physical Resource Block-Number Physical Sidelink Shared Channel-Release 15 (minRB-NumberPSSCH-r15), and a maximum PRB number of the first transmission parameter may be represented by a Maximum Physical Resource Block-Number Physical Sidelink Shared Channel-Release 15 (maxRB-NumberPSSCH-r15). A minimum PRB number of the second transmission parameter may be represented by a Minimum Physical Resource Block-Number Physical Sidelink Shared Channel-Release 14 (minRB-NumberPSSCH-r14), and a maximum PRB number of the second transmission parameter may be represented by a Maximum Physical Resource Block-Number Physical Sidelink Shared Channel-Release 14 (maxRB-NumberPSSCH-r14).

In at least one embodiment, in condition that the first transmission parameter and the second transmission parameter are PRB number ranges and the terminal device acquires a proportion coefficient Q, where Q is a real number greater than 0, the terminal device processes the minimum PRB number of the second transmission parameter by use of the proportion coefficient Q to obtain the minimum PRB number of the first transmission parameter, and processes the maximum PRB number of the second transmission parameter by use of the proportion coefficient Q to obtain the maximum PRB number of the first transmission parameter.

The terminal device determines the first transmission parameter according to the minimum PRB number and maximum PRB number of the first transmission parameter.

For example, minRB-NumberPSSCH-r15=ceil(Q*minRB-NumberPSSCH-r14); and maxRB-NumberPSSCH-r15=ceil(Q*maxRB-NumberPSSCH-r14), where ceil( ) represents rounding up.

The terminal device determines the PRB number range according to the minRB-NumberPSSCH-r15 and the maxRB-NumberPSSCH-r15.

In at least one embodiment, in condition that the first transmission parameter and the second transmission parameter are the PRB number ranges and the terminal device acquires proportion coefficients X and Y, where X is a real number greater than 0 and Y is a real number greater than 0, the terminal device processes the minimum PRB number of the second transmission parameter by use of the proportion coefficient X to obtain the minimum PRB number of the first transmission parameter, and processes the maximum PRB number of the second transmission parameter by use of the proportion coefficient Y to obtain the maximum PRB number of the first transmission parameter.

The terminal device determines the first transmission parameter according to the minimum PRB number and maximum PRB number of the first transmission parameter.

For example, minRB-NumberPSSCH-r15=ceil(X*minRB-NumberPSSCH-r14); and maxRB-NumberPSSCH-r15=ceil(Y*maxRB-NumberPSSCH-r14), where ceil( ) represents rounding up.

The terminal device determines the PRB number range according to the minRB-NumberPSSCH-r15 and the maxRB-NumberPSSCH-r15.

It is to be understood that the proportion coefficients X and Y are different values.

In at least one embodiment, determination of the minRB-NumberPSSCH-r15 and the maxRB-NumberPSSCH-r15 by rounding up ceil( ) is only one implementation mode of the embodiment of the disclosure. In the embodiment of the disclosure, rounding down floor( ) and rounding round( ) may also be adopted, or determination of the minRB-NumberPSSCH-r15 and determination of the maxRB-NumberPSSCH-r15 may be implemented by different operations.

In at least one embodiment, a minimum sub-band number of the first transmission parameter may be represented by a Minimum Sub Band-Number Physical Sidelink Shared Channel-Release 15 (minSB-NumberPSSCH-r15), a maximum sub-band number of the first transmission parameter may be represented by a Maximum Sub Band-Number Physical Sidelink Shared Channel-Release 15 (maxSB-NumberPSSCH-r15). A minimum sub-band number of the second transmission parameter may be represented by a Minimum Sub Band-Number Physical Sidelink Shared Channel-Release 14 (minSB-NumberPSSCH-r14), and a maximum sub-band number of the second transmission parameter may be represented by a Maximum Sub Band-Number Physical Sidelink Shared Channel-Release 14 (maxSB-NumberPSSCH-r14).

In at least one embodiment, in condition that the first transmission parameter and the second transmission parameter are sub-band number ranges and the terminal device acquires a proportion coefficient R, R being a real number greater than 0, the terminal device processes the minimum sub-band number of the second transmission parameter by use of the proportion coefficient R to obtain the minimum sub-band number of the first transmission parameter, and processes the maximum sub-band number of the second transmission parameter by use of the proportion coefficient R to obtain the maximum sub-band number of the first transmission parameter.

The terminal device determines the first transmission parameter according to the minimum sub-band number and maximum sub-band number of the first transmission parameter.

For example, minSB-NumberPSSCH-r15=ceil(R*minSB-NumberPSSCH-r14); and maxSB-NumberPSSCH-r15=ceil(R*maxSB-NumberPSSCH-r14), where ceil( ) represents rounding up.

The terminal device determines the sub-band number range according to the minSB-NumberPSSCH-r15 and the maxSB-NumberPSSCH-r15.

In at least one embodiment, in condition that the first transmission parameter and the second transmission parameter are the sub-band number ranges and the terminal device acquires proportion coefficients V and W, V being a real number greater than 0 and W being a real number greater than 0, the terminal device processes the minimum sub-band number of the second transmission parameter by use of the proportion coefficient V to obtain the minimum sub-band number of the first transmission parameter, and processes the maximum sub-band number of the second transmission parameter by use of the proportion coefficient W to obtain the maximum sub-band number of the first transmission parameter.

The terminal device determines the first transmission parameter according to the minimum sub-band number and maximum sub-band number of the first transmission parameter.

For example, minSB-NumberPSSCH-r15=ceil(V*minSB-NumberPSSCH-r14); and maxSB-NumberPSSCH-r15=ceil(W*maxSB-NumberPSSCH-r14), where ceil( ) represents rounding up.

The terminal device determines the sub-band number range according to the minSB-NumberPSSCH-r15 and the maxSB-NumberPSSCH-r15.

It is to be understood that the proportion coefficients V and W are different values.

In at least one embodiment, determination of the minSB-NumberPSSCH-r15 and the maxSB-NumberPSSCH-r15 by rounding up ceil( ) is only one implementation mode of the embodiment of the disclosure. In the embodiment of the disclosure, rounding down floor( ) and rounding round( ) may also be adopted, or determination of the minSB-NumberPSSCH-r15 and determination of the maxSB-NumberPSSCH-r15 may be implemented by different operations.

In 220, the terminal device sends the service to be transmitted using the first transmission parameter.

In at least one embodiment, the method 200 is applied to a D2D communication system.

For example, the D2D communication is communication between the terminal device 20 and the terminal device 30 in FIG. 1 or FIG. 2.

Therefore, in the method for transmission parameter determination of the embodiment of the disclosure, the terminal device determines the first transmission parameter for sending the service to be transmitted according to the CBR and the priority of the service to be transmitted, so that the terminal device may determine a transmission parameter meeting a Rel-15 transmission requirement.

Furthermore, the terminal device may process the second transmission parameter determined according to the CBR and the priority of the service to be transmitted using the at least one proportion coefficient, to obtain the first transmission parameter for sending the service to be transmitted. Therefore, the terminal device may determine a transmission parameter for Rel-15 based on an existing transmission parameter, thereby meeting a transmission requirement of the Rel-15 terminal device.

FIG. 4 is a schematic flowchart of a method 300 for transmission parameter determination according to an embodiment of the disclosure. As illustrated in FIG. 4, the method 300 may be executed by a network device, the network device may be the network device illustrated in FIG. 1, and a terminal device in the method 300 may be the terminal device illustrated in FIG. 1 or FIG. 2. The method 300 includes the following content.

In 310, the network device configures for a terminal device at least one proportion coefficient for a first transmission parameter, to enable the terminal device to process a second transmission parameter using the at least one proportion coefficient to obtain the first transmission parameter.

The first transmission parameter is a parameter used by the terminal device for sending a service to be transmitted. The second transmission parameter is determined according to a CBR and a priority of the service to be transmitted.

In at least one embodiment, the method 300 further includes the following operation.

The network device configures a mapping relationship among CBRs, priorities of services and second transmission parameters for the terminal device, to enable the terminal device to determine the second transmission parameter according to the CBR, the priority of the service to be transmitted and the mapping relationship.

In at least one embodiment, the operation that the network device configures the mapping relationship among CBRs, priorities of services and second transmission parameters includes the following action.

The network device configures the mapping relationship for the terminal device through RRC signaling.

In at least one embodiment, the first transmission parameter is at least one of an MCS range or a PRB number range, and the second transmission parameter is at least one of an MCS range or a PRB number range.

In at least one embodiment, the operation that the network device configures for the terminal device the at least one proportion coefficient for the first transmission parameter includes the following action.

The network device configures the at least one proportion coefficient for the terminal device through the RRC signaling.

In at least one embodiment, the method 300 is applied to a D2D system.

It is to be understood that the operations in the method 300 for transmission parameter determination may make reference to descriptions about the corresponding operations in the method 200 for transmission parameter determination and will not be elaborated herein for simplicity.

In such a manner, in the method for transmission parameter determination of the embodiment of the disclosure, the terminal device determines the first transmission parameter used for sending the service to be transmitted according to the CBR and the priority of the service to be transmitted, so that the terminal device may determine a transmission parameter meeting a Rel-15 transmission requirement.

Furthermore, the terminal device may process the second transmission parameter determined according to the CBR and the priority of the service to be transmitted using the at least one proportion coefficient to obtain the first transmission parameter for sending the service to be transmitted. Therefore, the terminal device may determine a transmission parameter for Rel-15 based on an existing transmission parameter, and a transmission requirement of the Rel-15 terminal device is met.

FIG. 5 is a schematic flowchart of a method 400 for transmission parameter determination according to an embodiment of the disclosure. As illustrated in FIG. 5, the method 400 may be executed by a network device, the network device may be the network device illustrated in FIG. 1, and a terminal device in the method 300 may be the terminal device illustrated in FIG. 1 or FIG. 2. The method 400 includes the following content.

In 410, the network device configures a first mapping relationship for a first terminal device, and the first mapping relationship is configured to indicate a correspondence among CBRs, priorities of services and first transmission parameters.

In 420, the network device configures a second mapping relationship for a second terminal device, and the second mapping relationship is configured to indicate a correspondence among CBRs, priorities of services and second transmission parameters.

The first transmission parameter includes a first MCS index, and the second transmission parameter includes a second MCS index.

In at least one embodiment, the first MCS index is obtained according to a first MCS table, and the second MCS index is obtained according to a second MCS table. The first MCS table is different from the second MCS table.

In at least one embodiment, the network device may configure the first mapping relationship for the first terminal device and configure the second mapping relationship for the second terminal device through RRC signaling.

In at least one embodiment, the first terminal device supports a Rel-15 communication protocol, and the second terminal device supports a Rel-14 communication protocol.

In at least one embodiment, the method is applied to a D2D system.

For example, the first terminal device may perform D2D communication according to the determined transmission parameter.

In at least one embodiment, the first MCS table may be an MCS table under the Rel-15 communication protocol, and the second MCS table may be an MCS table under the Rel-14 communication protocol.

For example, the MCS table illustrated in Table 1 below is an MCS table under the Rel-14 communication protocol. MCS indexes in the MCS table correspond to a modulation order, a Transport Block Size (TBS) index and a Redundancy Version (RV) respectively.

In at least one embodiment, transmission parameters corresponding to values of MCS indexes in the first MCS table are partially or completely different from transmission parameters corresponding to values of MCS indexes in the second MCS table.

| MCS index $I_{MCS}$ | Modulation order $Q_m'$ | TBS index $I_{TBS}$ | RV $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | | Reserved | 1 |
| 30 | | | 2 |
| 31 | | | 3 |

It is to be understood that Table 1 is only an example, the values of MCS indexes in the first MCS table may also correspond to transmission parameters on a Physical Sidelink Shared Channel (PSSCH), and the values of MCS indexes in the first MCS table may also correspond to other parameters except the modulation order, the TBS index and the RV. There are no limits made thereto in the embodiment of the disclosure.

It is to be understood that the operations in the method 400 for transmission parameter determination may make reference to descriptions about the corresponding operations in the method 200 for transmission parameter determination and will not be elaborated herein for simplicity.

In such a manner, in the method for transmission parameter determination of the embodiments of the disclosure, the network device configures the first mapping relationship for the first terminal device, so that the first terminal device may determine the first transmission parameter including the first MCS index according to the first mapping relationship. Meanwhile, the network device configures the second mapping relationship for the second terminal device, so that the second terminal device may determine the second transmission parameter including the second MCS index according to the second mapping relationship.

Figure 6:
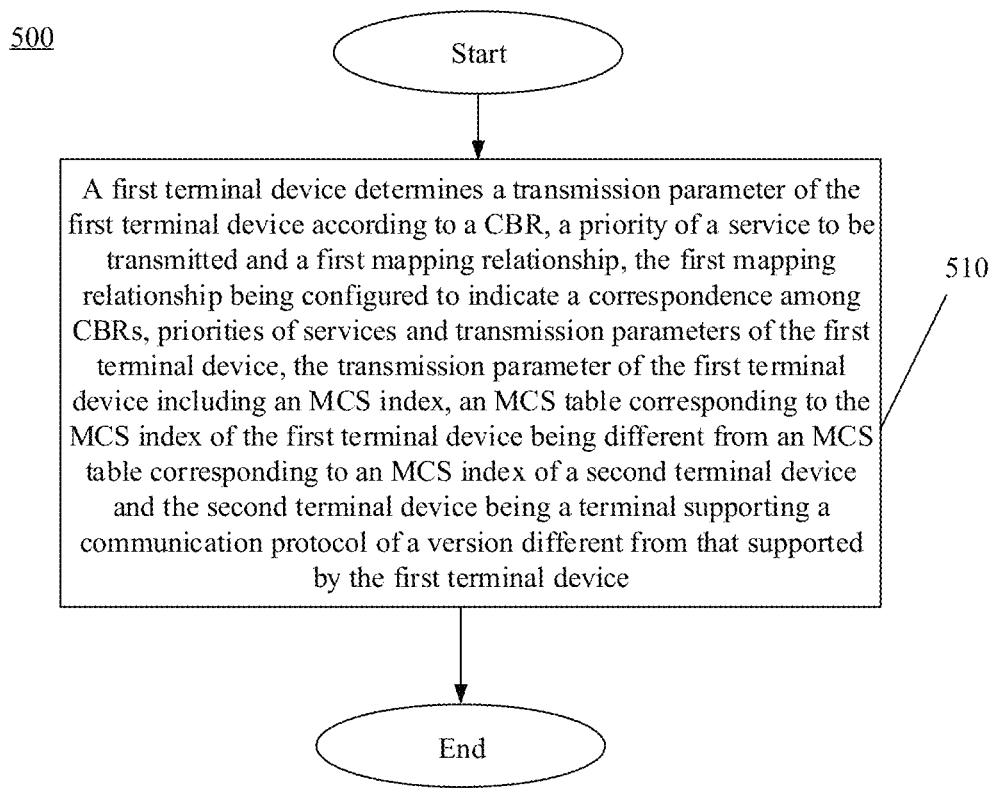
FIG. 6 is a schematic flowchart of another transmission parameter determination method according to an embodiment of the disclosure.

FIG. 6 is a schematic flowchart of a method 500 for transmission parameter determination according to an embodiment of the disclosure. As illustrated in FIG. 6, the method 500 may be executed by a terminal device, the terminal device may be the terminal device illustrated in FIG. 1 or FIG. 2, and a network device in the method 500 may be the network device illustrated in FIG. 1. The method 500 includes the following content.

In 510, a first terminal device determines a transmission parameter of the first terminal device according to a CBR, a priority of a service to be transmitted and a first mapping relationship, and the first mapping relationship is configured to indicate a correspondence among CBRs, priorities of services and transmission parameters of the first terminal device.

The transmission parameter of the first terminal device includes an MCS index, and an MCS table corresponding to the MCS index of the first terminal device is different from an MCS table corresponding to an MCS index of a second terminal device. The second terminal device is a terminal device supporting a version of a communication protocol different from a version of a communication protocol supported by the first terminal device.

In at least one embodiment, the method 500 further includes the following operation.

The first terminal device receives the first mapping relationship from the network device.

In at least one embodiment, the first mapping relationship is pre-configured in the first terminal device.

In at least one embodiment, the first terminal device supports a Rel-15 communication protocol, and the second terminal device supports a Rel-14 communication protocol.

In at least one embodiment, the MCS table corresponding to the MCS index of the first terminal device is an MCS table supporting the Rel-15 communication protocol, and the MCS table corresponding to the MCS index of the second terminal device is an MCS table supporting the Rel-14 communication protocol.

In at least one embodiment, the method is applied to a D2D system.

It is to be understood that the operations in the method 500 for transmission parameter determination may make reference to descriptions about the corresponding operations in the method 200 for transmission parameter determination and the method 400 for transmission parameter determination, which will not be elaborated herein for simplicity.

In such a manner, in the method for transmission parameter determination of the embodiments of the disclosure, the first terminal device determines the transmission parameter of the first terminal device according to the CBR, the priority of the service to be transmitted and the first mapping relationship, and meanwhile, the MCS table corresponding to the MCS index of the first terminal device is different from the MCS table corresponding to the MCS index of the second terminal device. Therefore, the first terminal device may determine the MCS index thereof according to the MCS table in the supported communication protocol.

Figure 7:
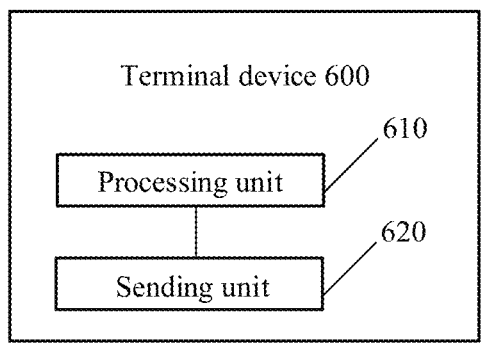
FIG. 7 is a schematic block diagram of a terminal device according to an embodiment of the disclosure.

FIG. 7 is a schematic block diagram of a terminal device 600 according to an embodiment of the disclosure. As illustrated in FIG. 7, the terminal device 600 includes a processing unit 610 and a sending unit 620.

The processing unit 610 is configured to determine a first transmission parameter according to a CBR and a priority of a service to be transmitted.

The sending unit 620 is configured to send the service to be transmitted using the first transmission parameter.

In at least one embodiment, the processing unit 610 is further configured to acquire at least one proportion coefficient. The at least one proportion coefficient is configured by a network device or pre-configured in the terminal device.

The processing unit 610 is further configured to determine a second transmission parameter according to the CBR and the priority of the service to be transmitted.

The processing unit 610 is further configured to process the second transmission parameter by use of the at least one proportion coefficient to obtain the first transmission parameter.

In at least one embodiment, the processing unit 610 is further configured to acquire a first mapping relationship. The first mapping relationship indicates a mapping relationship among CBRs, priorities of services and second transmission parameters.

The processing unit 610 is further configured to determine the second transmission parameter according to the CBR, the priority of the service to be transmitted and the mapping relationship.

The first mapping relationship is pre-configured in the terminal device or configured by the network device.

In at least one embodiment, the first transmission parameter is at least one of an MCS range or a PRB number range, and the second transmission parameter is at least one of an MCS range or a PRB number range.

In at least one embodiment, the first transmission parameter and the second transmission parameter are MCS ranges, and the terminal device acquires a proportion coefficient K, K being a real number greater than 0.

The processing unit 610 is further configured to process a minimum MCS index of the second transmission parameter by use of the proportion coefficient K to obtain a minimum MCS index of the first transmission parameter, and process a maximum MCS index of the second transmission parameter by use of the proportion coefficient K to obtain a maximum MCS index of the first transmission parameter.

The processing unit 610 is further configured to determine the first transmission parameter according to the minimum MCS index and the maximum MCS index of the first transmission parameter.

In at least one embodiment, the first transmission parameter and the second transmission parameter are the MCS ranges, and the terminal device acquires proportion coefficients M and N. M is a real number greater than 0 and N is a real number greater than 0.

The processing unit 610 is further configured to process the minimum MCS index of the second transmission parameter by use of the proportion coefficient M to obtain the minimum MCS index of the first transmission parameter, and process the maximum MCS index of the second transmission parameter by use of the proportion coefficient N to obtain the maximum MCS index of the first transmission parameter.

The processing unit 610 is further configured to determine the first transmission parameter according to the minimum MCS index and the maximum MCS index of the first transmission parameter.

In at least one embodiment, the first transmission parameter and the second transmission parameter are PRB number ranges, and the terminal device acquires a proportion coefficient Q, where Q is a real number greater than 0.

The processing unit 610 is further configured to process a minimum PRB number of the second transmission parameter by use of the proportion coefficient Q to obtain a minimum PRB number of the first transmission parameter, and process a maximum PRB number of the second transmission parameter by use of the proportion coefficient Q to obtain a maximum PRB number of the first transmission parameter.

The processing unit 610 is further configured to determine the first transmission parameter according to the minimum PRB number and the maximum PRB number of the first transmission parameter.

In at least one embodiment, the first transmission parameter and the second transmission parameter are the PRB number ranges, and the terminal device acquires proportion coefficients X and Y, where X is a real number greater than 0 and Y is a real number greater than 0.

The processing unit 610 is further configured to process the minimum PRB number of the second transmission parameter by use of the proportion coefficient X to obtain the minimum PRB number of the first transmission parameter, and process the maximum PRB number of the second transmission parameter by use of the proportion coefficient Y to obtain the maximum PRB number of the first transmission parameter.

The processing unit 610 is further configured to determine the first transmission parameter according to the minimum PRB number and the maximum PRB number of the first transmission parameter.

In at least one embodiment, the terminal device 600 is applied to a D2D system.

It is to be understood that the abovementioned and other operations and/or functions of each module in the terminal device 600 according to the embodiment of the disclosure are adopted to implement the corresponding operations executed by the terminal device in the method 200 of FIG. 3 respectively and, for simplicity, will not be elaborated herein.

Figure 8:
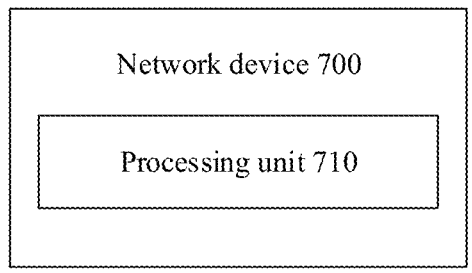
FIG. 8 is a schematic block diagram of a network device according to an embodiment of the disclosure.

FIG. 8 is a schematic block diagram of a network device 700 according to an embodiment of the disclosure. As illustrated in FIG. 8, the network device 700 includes a processing unit 710.

The processing unit 710 is adapted to configure for a terminal device at least one proportion coefficient for a first transmission parameter, to enable the terminal device to process a second transmission parameter using the at least one proportion coefficient to obtain the first transmission parameter.

The first transmission parameter is a parameter used by the terminal device for sending a service to be transmitted. The second transmission parameter is determined according to a CBR and a priority of the service to be transmitted.

In at least one embodiment, the processing unit 710 is further configured to configure a mapping relationship among CBRs, priorities of services and second transmission parameters for the terminal device, to enable the terminal device to determine the second transmission parameter according to the CBR, the priority of the service to be transmitted and the mapping relationship.

In at least one embodiment, the processing unit 710 is further adapted to configure the mapping relationship for the terminal device through RRC signaling.

In at least one embodiment, the first transmission parameter is at least one of an MCS range or a PRB number range, and the second transmission parameter is at least one of an MCS range or a PRB number range.

In at least one embodiment, the processing unit 710 is further adapted to configure the at least one proportion coefficient for the terminal device through the RRC signaling.

In at least one embodiment, the terminal device is applied to a D2D system.

It is to be understood that the abovementioned and other operations and/or functions of each module in the network device 700 according to the embodiment of the disclosure are adopted to implement the corresponding operations executed by the network device in the method 300 of FIG. 4 respectively, which will not be elaborated herein for simplicity.

Figure 9:
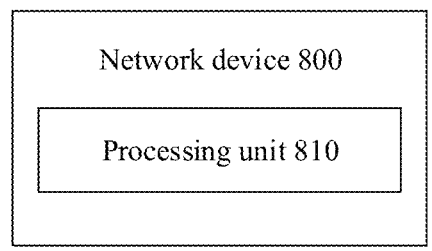
FIG. 9 is a schematic block diagram of another network device according to an embodiment of the disclosure.

FIG. 9 is a schematic block diagram of a network device 800 according to an embodiment of the disclosure. As illustrated in FIG. 9, the network device 800 includes a processing unit 810.

The processing unit 810 is adapted to configure a first mapping relationship for a first terminal device. The first mapping relationship is configured to indicate a correspondence among CBRs, priorities of services and first transmission parameters.

The processing unit 810 is further adapted to configure a second mapping relationship for a second terminal device. The second mapping relationship is configured to indicate a correspondence among CBRs, priorities of services and second transmission parameters.

The first transmission parameter includes a first MCS index, and the second transmission parameter includes a second MCS index.

In at least one embodiment, the first MCS index is obtained according to a first MCS table, and the second MCS index is obtained according to a second MCS table. The first MCS table is different from the second MCS table.

In at least one embodiment, the first terminal device supports a Rel-15 communication protocol, and the second terminal device supports a Rel-14 communication protocol.

In at least one embodiment, the first terminal device and the second terminal device are applied to a D2D system.

It is to be understood that the abovementioned and other operations and/or functions of each module in the network device 800 according to the embodiment of the disclosure are adopted to implement the corresponding operations executed by the network device in the method 400 of FIG. 5 respectively, which will not be elaborated herein for simplicity.

Figure 10:
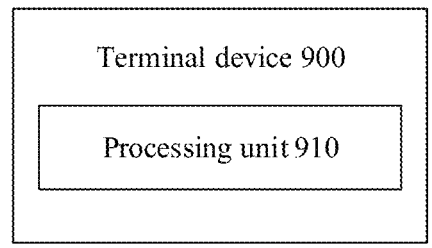
FIG. 10 is a schematic block diagram of another terminal device according to an embodiment of the disclosure.

FIG. 10 is a schematic block diagram of a terminal device 900 according to an embodiment of the disclosure. As illustrated in FIG. 10, the terminal device 900 includes a processing unit 910.

The processing unit 910 is configured to determine a transmission parameter of the terminal device according to a CBR and a first mapping relationship. The first mapping relationship is configured to indicate a correspondence among CBRs, priorities of services and transmission parameters of the terminal device.

The transmission parameters of the terminal device include an MCS index, and an MCS table corresponding to the MCS index of the terminal device is different from an MCS table corresponding to an MCS index of the other terminal device. The other terminal device is a terminal device supporting a version of a communication protocol different from a version of a communication protocol supported by the terminal device.

In at least one embodiment, the terminal device 900 further includes a receiving unit 920.

The receiving unit 920 is configured to receive the first mapping relationship from a network device.

In at least one embodiment, the first mapping relationship is pre-configured in the terminal device 900.

In at least one embodiment, the terminal device supports a Rel-15 communication protocol, and the other terminal device 900 supports a Rel-14 communication protocol.

In at least one embodiment, the terminal device 900 is applied to a D2D system.

It is to be understood that the abovementioned and other operations and/or functions of each module in the terminal device 900 according to the embodiment of the disclosure are adopted to implement the corresponding operations executed by the terminal device in the method 500 of FIG. 6 respectively, which will not be elaborated herein for simplicity.

Figure 11:
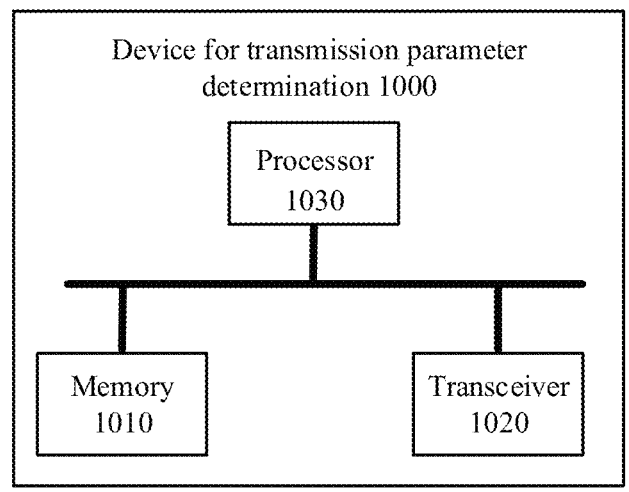
FIG. 11 is a schematic block diagram of a device for transmission parameter determination according to an embodiment of the disclosure.

FIG. 11 is a schematic block diagram of a device 1000 for transmission parameter determination according to an embodiment of the disclosure. The device 1000 includes a memory 1010, a transceiver 1020 and a processor 1030.

The memory 1010 is configured to store a program. The program includes a code.

The transceiver 1020 is configured to communicate with another device.

The processor 1030 is configured to execute the program code in the memory 1010.

In at least one embodiment, when the code is executed, the processor 1030 may further implement each operation executed by a terminal device in the method 200 of FIG. 3 or in the method 500 of the method 600. For simplicity, no more elaborations will be made herein. In such case, the device 1000 may be a terminal device, for example, a VUE.

In at least one embodiment, when the code is executed, the processor 1030 may further implement each operation executed by a network device in the method 300 of FIG. 4 or the method 400 of the method 500. For simplicity, no more elaborations will be made herein. In such case, the device 1000 may be a network device, for example, a base station.

It is to be understood that, in the embodiment of the disclosure, the processor 1030 may be a Central Processing Unit (CPU) and the processor 1030 may also be another universal processor, a Digital Signal Processor (DSP), an Application Specific Integrated Circuit (ASIC), an Field-Programmable Gate Array (FPGA) or another programmable logic device, discrete gate or transistor logic device and discrete hardware component and the like. The universal processor may be a microprocessor or the processor may also be any conventional processor and the like.

The memory 1010 may include a read-only memory and a random access memory (RAM) and provides an instruction and data for the processor 1030. A part of the memory 1010 may further include a nonvolatile RAM. For example, the memory 1010 may further store information of a device type.

The transceiver 1020 may be configured to realize signal sending and receiving functions, for example, frequency modulation and demodulation functions or up-conversion and down-conversion functions.

During an implementation process, at least one operation of the above method may be completed through an integrated logical circuit of hardware in the processor 1030, or the integrated logical circuit may complete the at least one operation under driving of an instruction in a software form. Therefore, the device 1000 for transmission parameter determination may be a chip or a chip set. The operations of the method disclosed in combination with the embodiments of the disclosure may be directly embodied to be executed and completed by a hardware processor or executed and completed by a combination of hardware and software modules in the processor. The software module may be located in a mature storage medium in the art, such as a random access memory, a flash memory, a read-only memory, a programmable read-only memory or electrically erasable programmable read-only memory or a register. The storage medium is located in the memory. The processor 1030 reads information in the memory, and completes the operations of the foregoing methods in combination with hardware of the processor. No more detailed descriptions will be made herein to avoid repetitions.

Figure 12:
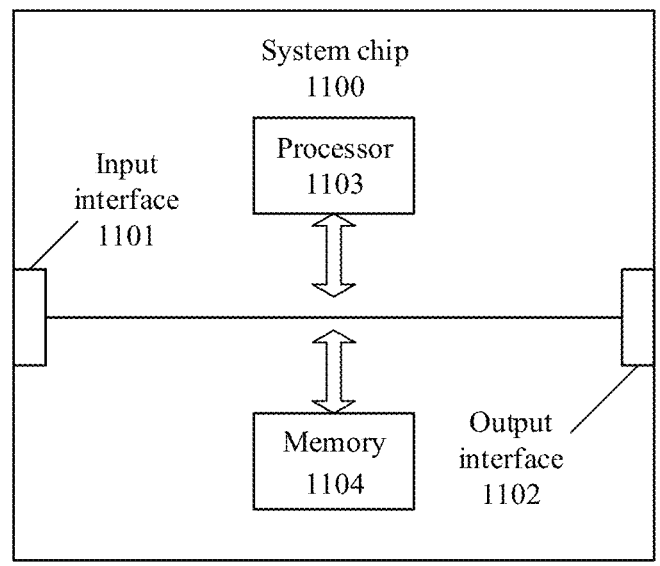
FIG. 12 is a schematic structure diagram of a system chip according to an embodiment of the disclosure.

FIG. 12 is a schematic structure diagram of a system chip 1100 according to an embodiment of the disclosure. The system chip 1100 of FIG. 12 includes an input interface 1101, an output interface 1102, a processor 1103 and a memory 1104 which may be connected through an internal communication connecting line. The processor 1103 is configured to execute a code in the memory 1104.

In at least one embodiment, when the code is executed, the processor 1103 implements methods executed by a terminal device in the method embodiments. For simplicity, no more elaborations will be made herein.

In at least one embodiment, when the code is executed, the processor 1103 implements methods executed by a network device in the method embodiments. For simplicity, no more elaborations will be made herein.

The embodiments may be implemented completely or partially through software, hardware, firmware or any combination thereof. During implementation with the software, the embodiments may be implemented completely or partially in form of a computer program product. The computer program product includes one or more computer instructions. When the computer program instruction is loaded and executed on a computer, the flows or functions according to the embodiments of the disclosure are completely or partially generated. The computer may be a universal computer, a dedicated computer, a computer network or another programmable device. The computer instruction may be stored in a computer-readable storage medium or transmitted from one computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a DVD), a semiconductor medium (for example, a Solid State Disk (SSD)) or the like.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Those skilled in the art may clearly learn about that specific working processes of the system, device and unit described above may refer to the corresponding processes in the method embodiments and will not be elaborated herein for convenient and brief description.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmission parameter determination, comprising:
    determining, by a first terminal device, a first transmission parameter of the first terminal device according to a channel busy ratio (CBR), a priority of a service to be transmitted and a first mapping relationship, the first mapping relationship being configured to indicate a correspondence among CBRs, priorities of services and first transmission parameters of the first terminal device,
    wherein the first transmission parameter of the first terminal device comprises a modulation and coding scheme (MCS) index, an MCS table corresponding to the MCS index of the first terminal device is different from an MCS table corresponding to an MCS index of a second terminal device, and the second terminal device is a terminal device supporting a version of a communication protocol different from a version of a communication protocol supported by the first terminal device,
    wherein the MCS index of the second terminal device is comprised in a second transmission parameter, and the second transmission parameter is determined according to a CBR, a priority of a service to be transmitted and a second mapping relationship, the second mapping relationship being configured to indicate a correspondence among CBRs, priorities of services and second transmission parameters.

2. The method of claim 1, further comprising:
    receiving, by the first terminal device, the first mapping relationship from a network device.

3. The method of claim 1, wherein the first mapping relationship is pre-configured in the first terminal device.

4. The method of claim 1, wherein the first terminal device supports a Release 15 (Rel-15) communication protocol, and the second terminal device supports a Release 14 (Rel-14) communication protocol, or
    the first terminal device supports the Rel-14 communication protocol, and the second terminal device supports the Rel-15 communication protocol.

5. The method of claim 1, wherein the method is applied to a Device to Device (D2D) system.

6. A terminal device, comprising:
    a processor, adapted to determine a first transmission parameter of the terminal device according to a channel busy ratio (CBR), a priority of a service to be transmitted and a first mapping relationship, the first mapping relationship being configured to indicate a correspondence among CBRs, priorities of services and first transmission parameters of the first terminal device,
    wherein the first transmission parameter of the first terminal device comprises a modulation and coding scheme (MCS) index, an MCS table corresponding to the MCS index of the first terminal device is different from an MCS table corresponding to an MCS index of another terminal device, and the another terminal device is a terminal device supporting a version of a communication protocol different from a version of a communication protocol supported by the first terminal device, wherein the MCS index of the another terminal device is comprised in a second transmission parameter, and the second transmission parameter is determined according to a CBR, a priority of a service to be transmitted and a second mapping relationship, the second mapping relationship being configured to indicate a correspondence among CBRs, priorities of services and second transmission parameters.

7. The terminal device of claim 6, further comprising:
a transceiver, adapted to receive the first mapping relationship from a network device.

8. The terminal device of claim 6, wherein the first mapping relationship is pre-configured in the terminal device.

9. The terminal device of claim 6, wherein the terminal device supports a Release 15 (Rel-15) communication protocol, and the another terminal device supports a Release 14 (Rel-14) communication protocol, or
the first terminal device supports the Rel-14 communication protocol, and the another terminal device supports the Rel-15 communication protocol.

10. The terminal device of claim 6, wherein the terminal device is applied to a Device to Device (D2D) system.

11. A network device, comprising: a processor, adapted to:
configure a first mapping relationship for a first terminal device, the first mapping relationship being configured to indicate a correspondence among channel busy ratios (CBRs), priorities of services and first transmission parameters; and
configure a second mapping relationship for a second terminal device, the second mapping relationship being configured to indicate a correspondence among CBRs, priorities of services and second transmission parameters;
wherein the first transmission parameter comprises a first modulation and coding scheme (MCS) index, and the second transmission parameter comprises a second MCS index,
wherein the second terminal device is a terminal device supporting a version of a communication protocol different from a version of a communication protocol supported by the first terminal device.

12. The network device of claim 11, wherein the first MCS index is obtained according to a first MCS table, and the second MCS index is obtained according to a second MCS table, the first MCS table being different from the second MCS table.

13. The network device of claim 11, wherein the first terminal device supports a Release 15 (Rel-15) communication protocol, and the second terminal device supports a Release 14 (Rel-14) communication protocol, or
the first terminal device supports the Rel-14 communication protocol, and the second terminal device supports the Rel-15 communication protocol.

14. The network device of claim 11, wherein the first terminal device and the second terminal device are applied to a Device to Device (D2D) system.

* * * * *